US012391432B2

(12) United States Patent
Greco

(10) Patent No.: US 12,391,432 B2
(45) Date of Patent: Aug. 19, 2025

(54) CONTAINMENT SYSTEM FOR A SUBSTANCE IN LIQUID OR PARTICULATE FORM

(71) Applicant: Luca Greco, Abbadia Lariana (IT)

(72) Inventor: Luca Greco, Abbadia Lariana (IT)

( * ) Notice: Subject to any disclaimer, the term of this patent is extended or adjusted under 35 U.S.C. 154(b) by 117 days.

(21) Appl. No.: 18/252,566

(22) PCT Filed: Nov. 11, 2021

(86) PCT No.: PCT/IB2021/060452
§ 371 (c)(1),
(2) Date: May 11, 2023

(87) PCT Pub. No.: WO2022/101822
PCT Pub. Date: May 19, 2022

(65) Prior Publication Data

US 2023/0406569 A1 Dec. 21, 2023

(30) Foreign Application Priority Data

Nov. 12, 2020 (IT) ........................ 102020000027164

(51) Int. Cl.
*B65D 21/02* (2006.01)
*B08B 17/02* (2006.01)
(Continued)

(52) U.S. Cl.
CPC ........ *B65D 21/0201* (2013.01); *B08B 17/025* (2013.01); *B65D 19/0002* (2013.01); *B65D 88/027* (2013.01); *B65D 2519/00567* (2013.01)

(58) Field of Classification Search
CPC ...... B65D 21/0201; B65D 2519/00567; B65D 19/0002; B65D 21/0224; B65D 88/027;
(Continued)

(56) References Cited

U.S. PATENT DOCUMENTS 5,562,047 A 10/1996 Forney et al.
2022/0281639 A1* 9/2022 Ismert ................ B65D 11/1873

FOREIGN PATENT DOCUMENTS

AU 492386 B2 6/1976
GB 1239045 A 7/1971
GB 2487192 A 7/2012

OTHER PUBLICATIONS

International Search Report for PCT/IB2021/060452 mailed Jan. 26, 2022, 2 pages.

(Continued)

*Primary Examiner* — Orlando E Aviles
*Assistant Examiner* — Sanjidul Islam
(74) *Attorney, Agent, or Firm* — NIXON & VANDERHYE

(57) ABSTRACT

Disclosed is a containment system for a substance in liquid or particulate form including juxtaposed collection containers and at least one connection bracket including a flattened base and locking unit including at least two locking elements, protruding from two respective ends of the base, wherein the collection container includes a support base which has at least one groove on its outer face which opens onto at least one edge of the support base, the groove having at least one indented housing having a plan shape equal to that of the locking elements and wherein the bracket has the first locking element inserted into the housing of a first container and the second locking element inserted into the housing of a second container.

16 Claims, 5 Drawing Sheets

(51) Int. Cl.
*B65D 19/00* (2006.01)
*B65D 88/02* (2006.01)

(58) Field of Classification Search
CPC ...... B65D 1/04; B65D 81/32; B65D 81/3216; B08B 17/025
USPC ......................... 220/23.4; 222/129, 132, 143
See application file for complete search history.

(56) References Cited

OTHER PUBLICATIONS

Written Opinion of the ISA for PCT/IB2021/060452 mailed Jan. 26, 2022, 5 pages.

* cited by examiner

CONTAINMENT SYSTEM FOR A SUBSTANCE IN LIQUID OR PARTICULATE FORM

This application is the U.S. national phase of International Application No. PCT/IB2021/060452 filed Nov. 11, 2021 which designated the U.S. and claims priority to IT 102020000027164 filed Nov. 12, 2020, the entire contents of each of which are hereby incorporated by reference.

BACKGROUND OF THE INVENTION

Field of the Invention

The present invention relates to a containment system for a substance in liquid or particulate form, such as for example a powder. In particular, the present invention relates to a modular system comprising at least two collection containers connected to each other by connection means. More particularly, these connection means connect the base of a first container with that of a second container placed side by side.

Description of the Related Art

The containment systems are used in various industrial sectors, for example in the chemical industries or in the manufacturing industries, in particular where it is necessary to withdraw a substance in a generally liquid form from a large primary container, although the use of this containment system could also be useful if the substance is in particle form, such as a powder.

The main purpose of the containment system is to prevent the contents of the primary container from spilling onto the floor beneath and around said container. This can occur, for example, in the event of problems such as the perforation of the primary container or failure of the opening/closing tap of the outlet duct, or other unforeseen events, which cause an uncontrolled leakage of the contents. As a result of such leakage, the floor can be made slippery or become impregnated with corrosive, harmful substances or other substances. This eventuality could, therefore, be a source of danger for the person who is withdrawing the substance or who works near the primary container or any rescuers.

These systems have a use, sometimes, imposed by the accident prevention law.

According to a typology of containment systems, the containment system comprises containers which have, on their upper side, or opposite to the support base, a grill adapted to support a primary container, for example a drum, containing a substance to be withdrawn.

Modular containment systems are per se already known. This type is practical so that, on the one hand, when the system is not used, the various modules, disassembled and independent of each other, may be stacked and therefore, the system takes up less space than a non-removable containment system and, on the other, the system may be composed each time according to the dimensions suitable for the specific need by choosing to assemble the collection containers of the appropriate dimensions for the specific case.

Modular containment systems consist of two or more juxtaposed collection containers held together by connection means, the latter are usually present on the upper edges of their side walls.

Modular containment systems are also known, the containers of which are communicating with each other by means of suitable passages formed in the juxtaposed walls of the containers. These passages are usually present at half height of the wall. These passages, which are formed as needed, are suitably equipped, with pipes and gaskets, to facilitate and direct the flow of the fluid from one container to another.

Containment systems of this type of the prior art have the drawback that the connection between the collection containers may be precarious, which gives the system little guarantee of unity and stability, with the consequence that there is a good probability that the containers move away from each other while using the system, causing the undesired spillage of the substance on the floor.

In addition, the impromptu creation of bores to form said passages and the completion of the latter with said pipes and gaskets can lead to a bumpy job that causes leaky passages, for example due to a misalignment of two bores in the juxtaposed walls.

Furthermore, a system with a passage placed approximately halfway through the wall of the containers allows the filling of the juxtaposed container only when the first is (or the first are) filled at least up to half, i.e. not since the beginning of the containment action, this may create the risk of the substance leaking from the containment system, especially if the first collection container is not large enough to contain a large part of the spilled substance.

A new modular containment system has now been surprisingly found which has good stability and union of the collection containers thanks to connection means which connect the base of the juxtaposed collection containers. These connection means contribute, on the one hand, to the stability of the entire system and, on the other hand, to maintain both the union of the collection containers and their same spatial arrangement (for example, avoiding a rotation of a container with respect to the other) for the entire period of use of the system once mounted. A tenacious and unchanged union of the containers is, in fact, desirable to make an accidental detachment and/or displacement of the joined containers less likely, which could result in an undesired spillage of the substance from the primary container onto the floor.

This system also has the advantage of being easy, quick and practical to assemble and disassemble. The containers, which are locked to each other by means of brackets on which the containers fit by interlocking, are inserted vertically on the bracket, this insertion operation therefore provides for a movement of the container along a single axis which is vertical.

SUMMARY OF THE INVENTION

Therefore, the object of the present invention is a containment system for a substance in liquid or particulate form, said system comprises juxtaposed collection containers and at least one connection bracket having locking elements. In such a system, the bracket comprises a flattened base and two locking elements which protrude from two respective ends of the base.

Furthermore, according to the invention, each of the containers has a polygonal plan and comprises a support base delimited by edges, side walls, generally perpendicular to the support base and a grill, which is present on the side opposite the support base and resting on the walls.

In this container, said support base has at least one groove on its outer face. The latter has at least one indented housing having a plan shape equal to that of said two locking elements, hereinafter referred to as side locking elements.

Furthermore, said bracket has said first side locking element inserted in the seat of a first of the containers and said second side locking element inserted in the seat of a second of the containers.

Generally, said seat is in the vicinity of the perimeter, or the edges, of the support base. The seat is located at a distance, indicatively, of a value from 10 mm to 100 mm from each edge of the support base. Preferably, the support base has a number of housings equal at least to the number of sides of the support base, more preferably, each side, or edge, has at least one housing next to it.

The side locking element preferably has a polygonal shape, generally having a number of sides comprised between four and eight.

The housing therefore also preferably has a polygonal shape, generally having a number of sides comprised between four and eight.

The containers present in the containment system according to the present invention are two, three or more in number. The number of containers will vary according to the needs and the size in width/length of the containers used. Furthermore, the containers used in a given containment system may have the same or different width/length dimensions but, preferably, they all have the same height.

The container has a prism shape, preferably regular polygonal plan. The container has, for example, a triangular or, preferably, quadrangular plan.

The support base of the container has an outer face shaped by the presence, as previously mentioned, of at least one groove, the latter having said at least one housing. Said at least one groove opens at at least one of the edges of the support base.

According to a preferred embodiment, the groove opens, on the one hand, on a first edge and, on the other hand, on the edge opposite said first edge of the support base. In such embodiment, the groove has two seats, each of them in proximity to each of said two edges.

The groove generally has one or more of the following features:

- pattern straight and parallel to an edge of the support base,
- constant width, and
- constant depth.

Depending on the width/length dimension of the support base, the latter has, on the outer face, a variable number of grooves, from one to, generally, two or more. The two, three or more grooves are arranged parallel and/or orthogonal to each other.

In greater detail, in the case of only two or three grooves, these are all parallel to each other or, preferably, one groove is orthogonal to the other or to the other two, respectively, dividing it into two segments of the same length.

In the case of four or more grooves, these are preferably arranged in two series. In each series the grooves are parallel to each other, and the grooves of the two series intersect each other in an orthogonal manner, thus the grooves form a grill.

As previously mentioned, the containment system according to the present invention also comprises at least one bracket which joins two juxtaposed containers. The number of brackets usually depends on the size and number of collection containers in the system.

In the containment system in the formation in use, as described herein, the bracket is a connection device that fits into the support base of each of the two juxtaposed collection containers. In particular, the bracket has a shape and dimensions such that it fits into the cavities, i.e. groove and housing, present in the support base of each of the containers it joins.

In particular, in this arrangement, the bracket has a first portion thereof inserted in a groove of a first of said two containers and the second remaining portion in a groove of a second of said two containers. More specifically, each side locking element of the bracket is inserted in the housing present in each groove in which the bracket is engaged.

As mentioned above, the bracket has a flattened base. This base typically has a height equal to the depth of the groove.

Furthermore, the side locking elements each have a height that allows their complete insertion into the seat, i.e. each element has a height just below that of the seat, so that the bracket fits completely into the groove present in the support base of the container.

The containers may have a support base with chamfered edges. In this embodiment variant, the bracket may be provided with a centring element, hereinafter referred to as a central element, which is parallel to and equidistant from the two side locking elements. Said centring element has two inclined side walls. Each of these inclined side walls abuts against the chamfered edge of the support base of each container.

Also in this variant, the bracket fits entirely into the support bases of the two containers to be joined, therefore said centring element has a shape complementary to the space created between said two containers and a volume corresponding to the space between said two support bases of said two containers, so that there is neither a step between the bracket and the base of the containers, nor clearance between the central locking element and the chamfered edges of the two containers. This centring element has the purpose of both increasing the stability of the connection of the containment system and facilitating the insertion of the locking elements in their respective seats.

The collection container may be arranged to be in fluid communication through said bracket with a second collection container. In such variant, for this purpose, each container has at least one through bore on the top of said housing or has a circle, or other indicative sign, on the top of said seat to indicate where to make the bore. Furthermore, the bracket also has a through bore on the top of each of said side locking element and the two side locking elements are in fluid communication, for example through a tube, a passage or the like.

In this last embodiment variant, the containment system may have one or more of the following features:

- a sealing cap for at least each bore of each collection container, so as to close the bore when the container is not used in this variant; and
- a fitting, preferably provided with a gasket, this fitting is inserted in the through bores of each seat and of the side locking element.

According to such variant, the bracket preferably consists of a hollow body which defines an inner volume which opens onto the two bores of the locking elements. This inner volume therefore constitutes the passage which puts two adjacent containers in fluid communication.

The grill, present on the upper side of said containers, forms a support surface suitable for supporting a drum containing the substance in liquid or particulate form, for example a fine powder, to be discharged from the drum.

BRIEF DESCRIPTION OF THE DRAWINGS

Other features and advantages of the invention will emerge from the following detailed description of the non-limiting embodiments of the invention, with reference to the accompanying figures, in which.

DETAILED DESCRIPTION

Figure 1:
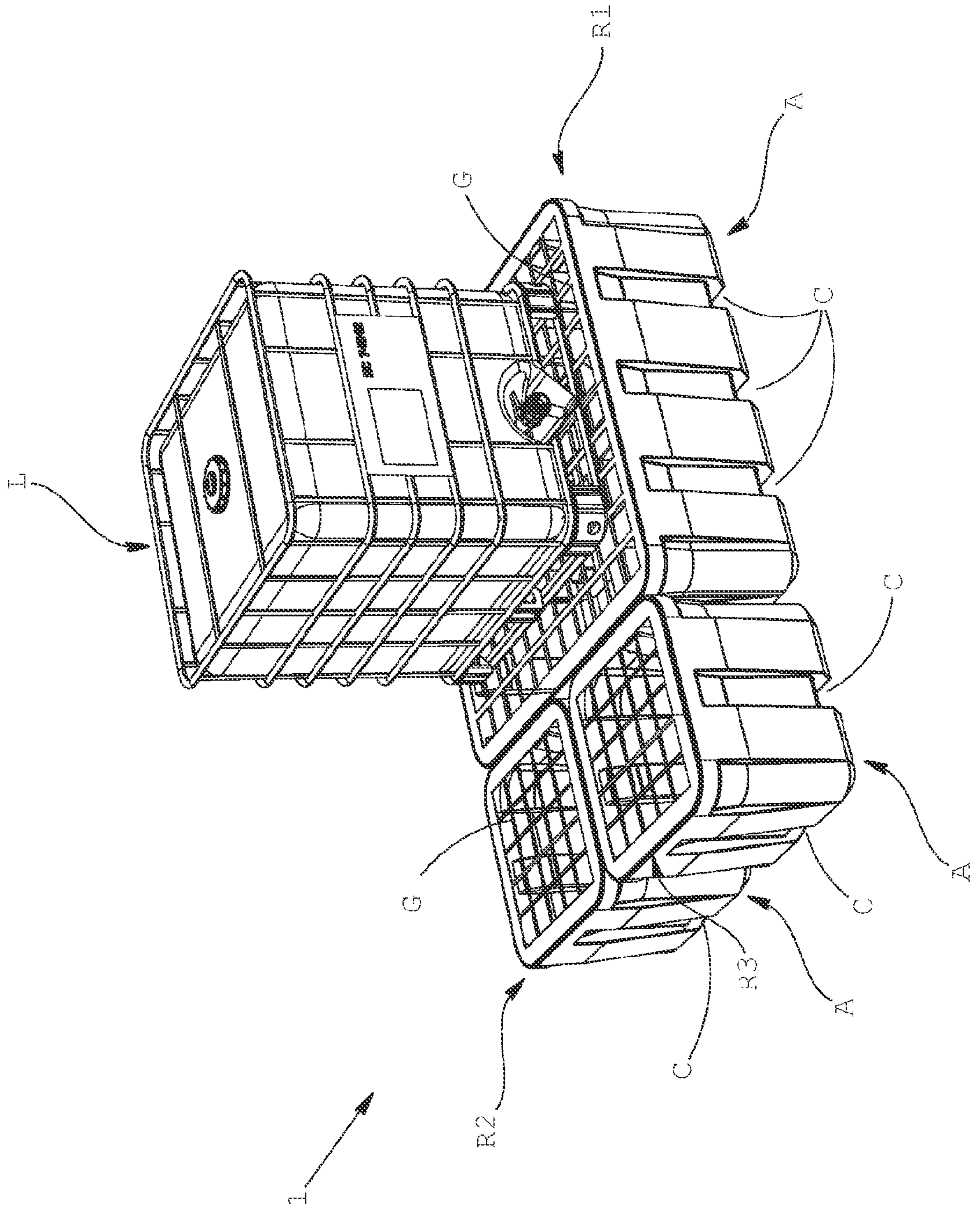
FIG. 1 shows a perspective view of the containment system according to an embodiment of the present invention.
Figure 2:
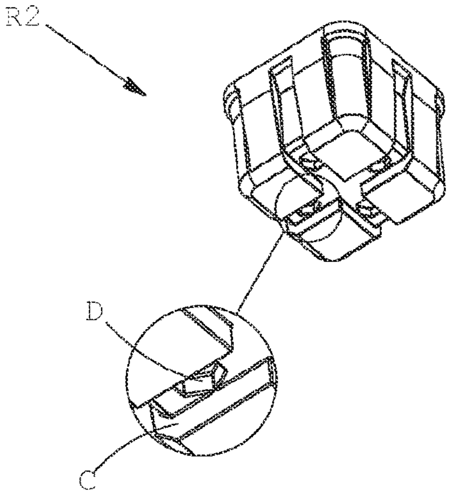
FIGS. 2 and 3 show bottom perspective views of containers usable in embodiments of the present invention.
Figure 3:
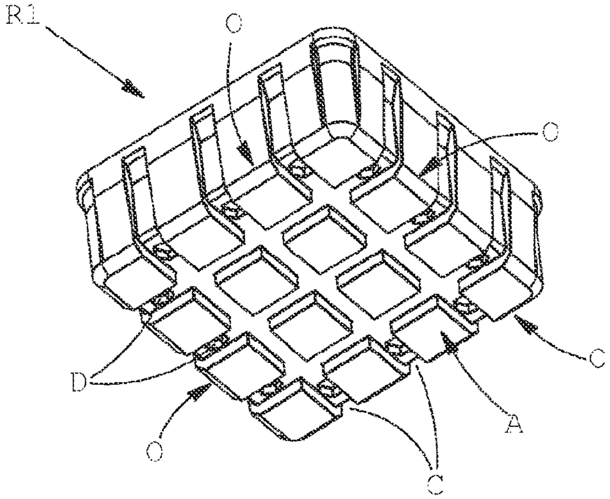

With reference to FIG. 1, the reference numeral 1 indicates as a whole the containment system according to the invention.

Figure 6:
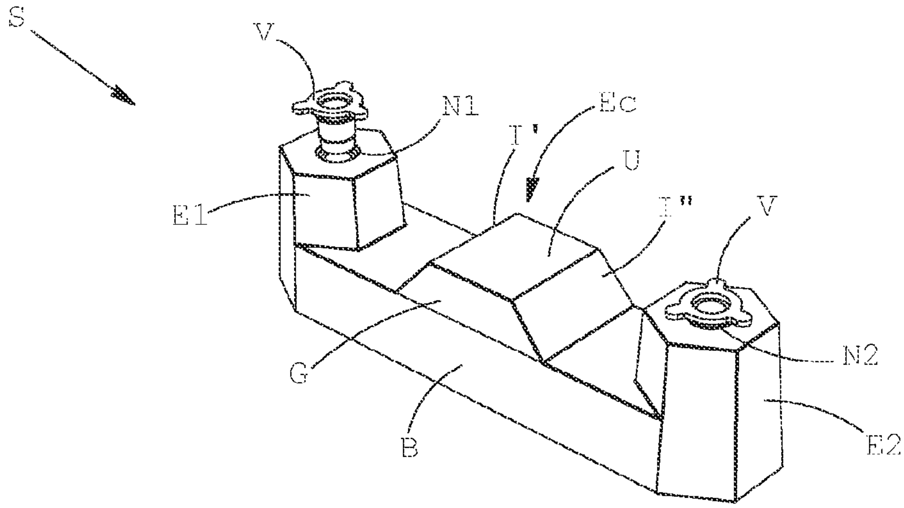
FIG. 6 is a representation of one of the components of the containment system according to an embodiment of the invention.

In the context of the present invention, the terms "lower", "upper", "side" refer to the components of the system 1, in the position of use, i.e. resting on the ground, as illustrated in FIGS. 1, 6 and 7.

The system 1 comprises two, three or more containers R1, R2, R3 with a generally square or rectangular support base A.

Each of these containers R1, R2, R3 has:

a support base A confined by edges O;

side walls P, which are typically substantially perpendicular to the support base A; and a grill G opposite the support base A.

Such grill G rests on the side walls P.

As illustrated in FIG. 1, this system 1 has an upper surface formed by two or more of said grills G. Said grill(s) G forms/form a support surface suitable for supporting a drum L containing the substance in liquid or particulate form, for example a fine powder, to be discharged from the drum L.

The support base has grooves C on the outer face. In particular, the container R2, R3 has only two grooves orthogonal to each other, so as to form a square cross, and the container R1 has two series of grooves, each series is composed of three grooves parallel to each other, and the grooves of the two series intersect each other in an orthogonal manner, so as to form a grill.

In the preferred and illustrated embodiment, each of the grooves C opens, on one side, on a first edge O and, on the opposite side, on a second edge O opposite the first of the support base A.

Furthermore, in this embodiment, the support base A has two housings D for each groove. More precisely, the housing D is in the vicinity of the edge O of the support base A. Typically, the seat is about 10-100 mm from the edge O.

In the first embodiment, the bracket S has a flattened base B and two locking elements E1, E2, each of which is at each end of the base B and has a hexagonal shape.

The base B is equal to or just less than the depth of the groove C.

The locking element E1, E2 fits into the seat D, which is also hexagonal in shape. This element is completely housed in the housing D, therefore the seat D has a height just higher than that of the locking element E1, E2.

Figure 4:
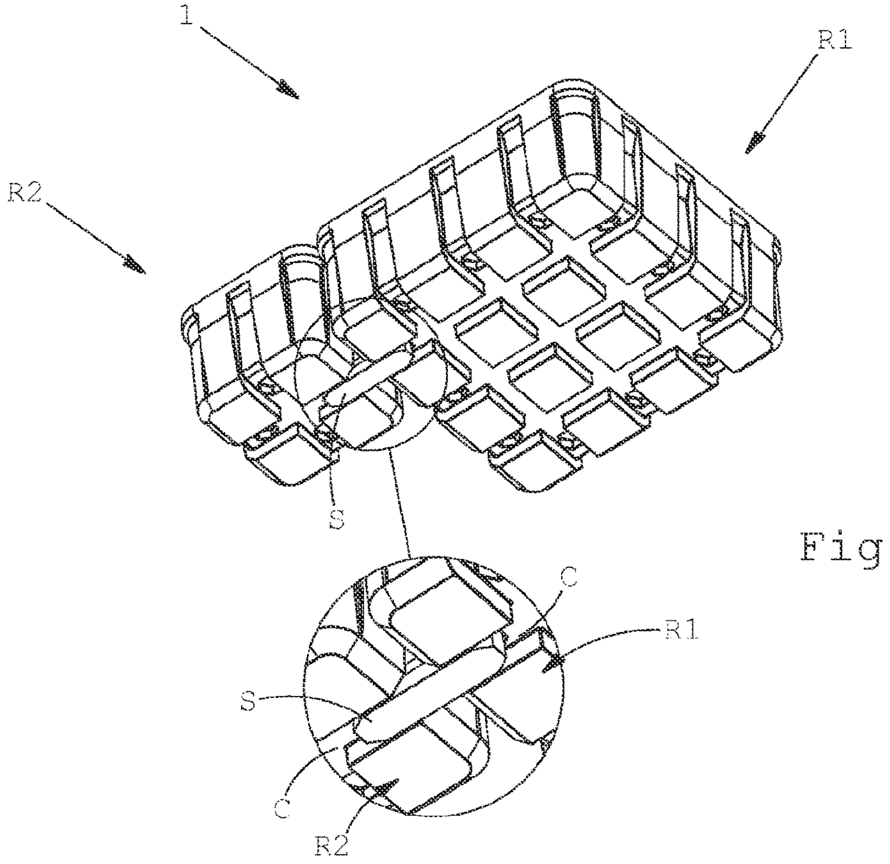
FIG. 4 is a bottom perspective view of the containment system according to an embodiment of the invention.
Figure 5A:
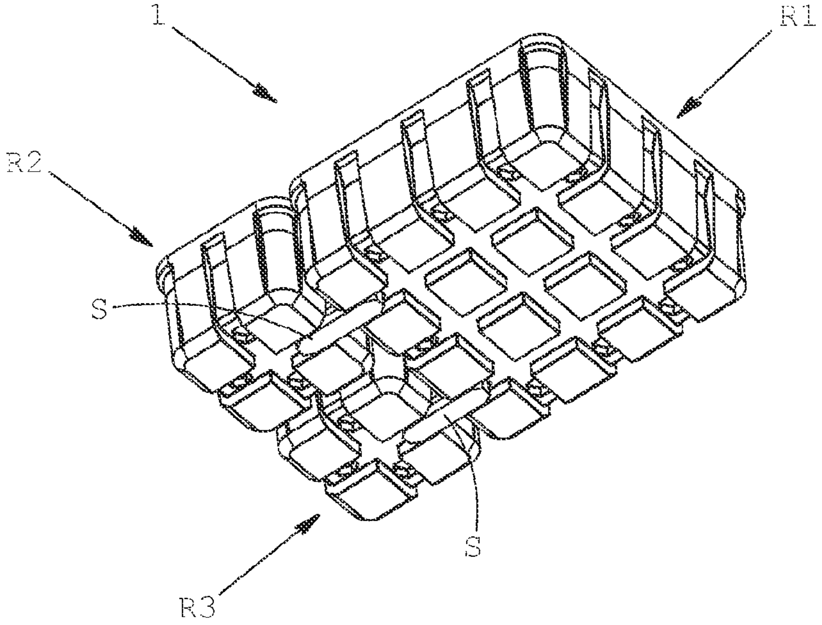
FIG. 5*a* is a bottom perspective view of the containment system according to a variant of the embodiment of the invention.

It is clear that, on the whole, the bracket S and the groove C have complementary shapes and similar volumes, so that the bracket fits into the groove precisely, i.e. without forming a step between them, as illustrated in FIGS. 4 and 5*a*. Said complementarity of shape and volume limits and/or excludes clearance between the bracket and the portion of the groove in which the bracket is inserted.

According to a preferred embodiment variant, the locking element E1, E2 is chamfered towards the top. This feature of said locking element favours and facilitates the insertion in the vertical direction of this element in its housing D and therefore of the container on the bracket.

According to a preferred embodiment variant, illustrated in the figures, the containers R1, R2, R3 have chamfered edges 0. This allows creating a further locking and centring zone and giving even more stability to the system 1 thanks to a bracket S as drawn in the variant illustrated below.

Within the scope of such variant, according to a preferred embodiment variant, illustrated in FIG. 6, the bracket has a further centring element Ec. This element Ec, hereinafter also referred to as the central element, is equidistant between the two locking elements E1, E2.

The central element Ec has a plan shape equal to the space formed between the wall and the support base A of two juxtaposed containers. The central element Ec fits into the space created between two juxtaposed collection containers in the lower part, this constitutes a further factor of stability and union in the containment system 1 according to the present invention.

In general, said central element Ec has the same width as the base B, with an upper face U flat and parallel to the flattened base B, two walls G parallel to each other and two inclined walls I', I''. Each of the two inclined walls I', I'' abuts against the corresponding chamfered edge of the support base A of each of the two containers R1, R2, R3 that the bracket joins.

In the example illustrated in FIG. 6, said central element Ec has the shape of an isosceles trapezoid in section X-X', and in the shape of a parallelepiped in section Z-Z'.

In a further preferred embodiment variant, illustrated in FIGS. 6 and 7, said containment system 1 comprises collection containers R1, R2, R3 placed in fluid communication with each other through said bracket S. This allows the substance that has been poured more into a first collection container to have the possibility of automatically distributing itself also in at least a second collection container connected to the first collection container by said bracket S so that the collection containers R1, R2, R3 can be equally filled up since the beginning of the leak of the substance from the drum L. This reduces the chances of a collection container overflowing.

In this variant, the system 1 comprises at least two collection containers R1, R2, R3 in each of which the support base A has at least one housing D having at its top a through bore F and at least one bracket S in fluid connection, hereinafter referred to as "hollow bracket" S, with said containers R1, R2, R3 said hollow bracket S fits into said housing D of said containers R1, R2, R3, said hollow bracket S having each of the locking elements E1, E2 having a through bore N1, N2 at their top.

This through bore F of the housing D is exactly at the through bore N1, N2 present in the locking element E1, E2. Said through bore F has a diameter equal to the through bore N1, N2 and said two bores F and N1, N2 coincide and overlap each other. The diameter of said bores F, N1, N2 is typically comprised between 15 and 40 mm.

According to a first embodiment of this hollow bracket, the latter has inside it a tube which connects the bore N1 of a first locking element E1 with the bore N2 of the second locking element E2.

According to a second preferred embodiment of this hollow bracket, the latter is totally hollow inside, so that the bracket can be filled with the substance poured into the containers R.

In this embodiment variant, the system 1 is further advantageous since the hollow bracket constitutes a further collection container, thereby increasing the volume capacity of the containment system.

In this variant of the system 1, the system may be provided with sealing plugs, in order to close the bores F of the seats D at which a locking element of a bracket is not inserted.

Figure 7A:
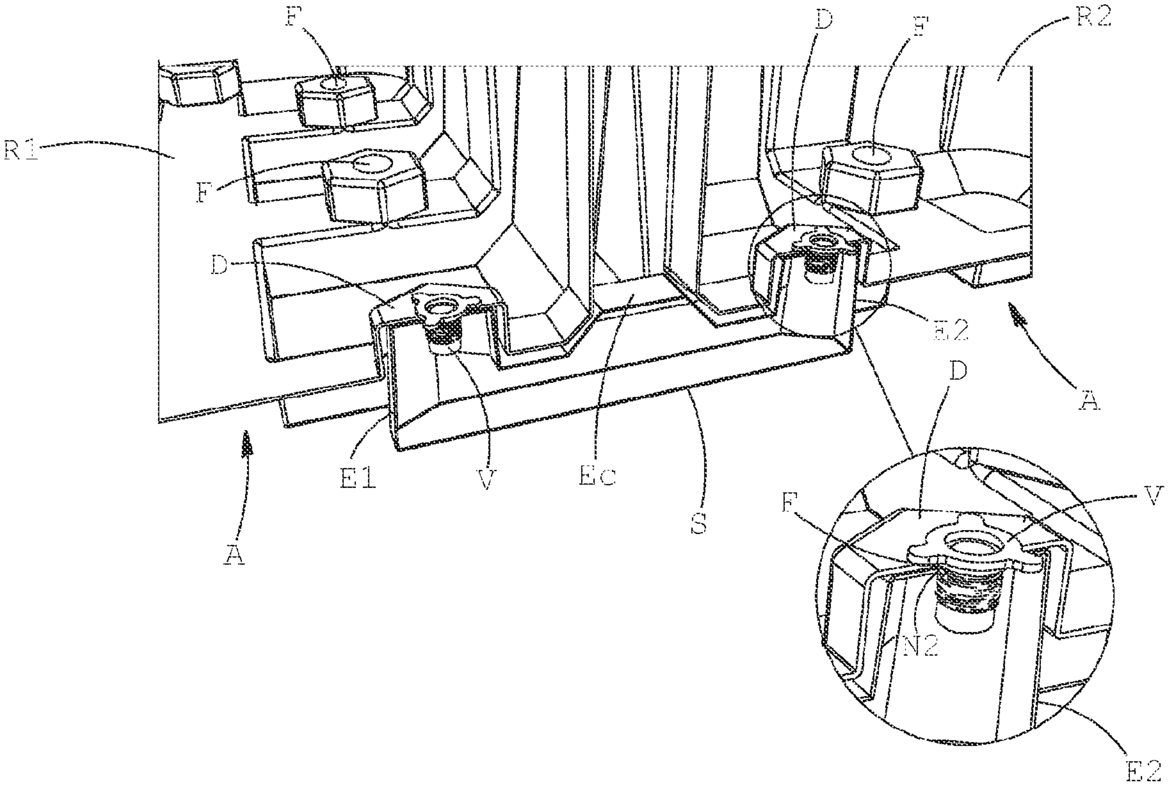
FIGS. 7*a*, 7*b* and 7*c* are sectional representations of the connection area of two containers of the containment system of the present invention.
Figure 7B:
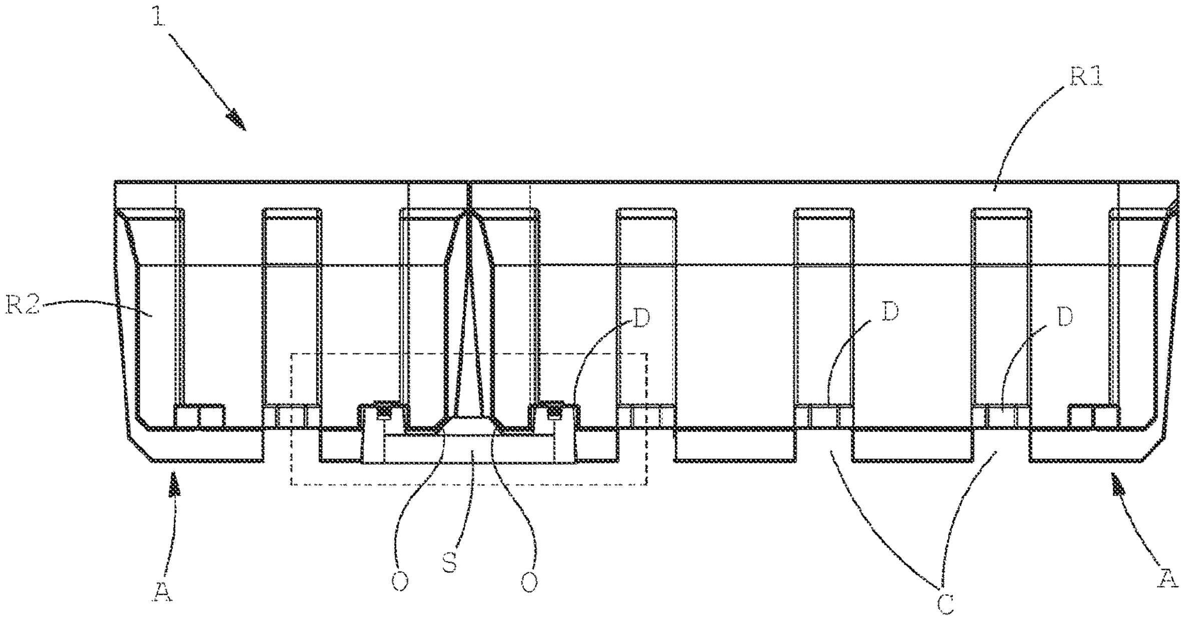
Figure 7C:
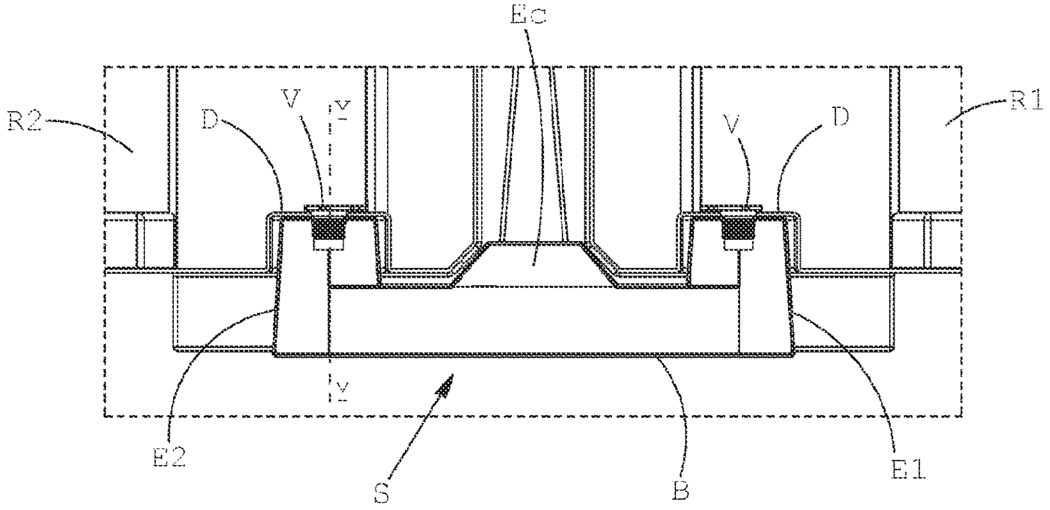

In a preferred variant, as illustrated in FIGS. 7*a*-7*c*, of such embodiment variant having bores in the containers R1, R2, R3 and in the hollow bracket S, a fitting V provided with a gasket is inserted in each bore F of the housing D and in the corresponding bore N1, N2 of the side locking element E1, E2.

This fitting V is typically a tube, smooth or, preferably, threaded. In the case of a threaded pipe V, the walls of the bore N1, N2 of the bracket S, or also the walls of the bore F of the housing D, have a counter-thread.

The tube V preferably has a collar Q which rests on the contour of the bore F.

The presence of this fitting is preferable to ensure a better seal of the system 1, so as to prevent the substance from escaping from the containment system 1.

In general, the groove C has the following dimensions: width of 70-100 mm and depth of 30-80 mm. Furthermore, in the case of two or more grooves parallel to each other on the outer face of the support base A of a container R1, R2, R3, the grooves have a distance between them, in general, between 10 cm and 50 cm, or in any case a distance which is preferably not greater than that between two blades of a forklift. This allows lifting the container R1, R2, R3 with a forklift by inserting the blades into the grooves C.

These containers have variable width and length dimensions. Generally such containers have a volumetric capacity from 100 to 1000 litres or more.

It goes without saying that in order to make the assembly of the system 1 according to the present invention quicker and more practical, in the same system 1 the same parts (i.e. grooves with seats, bracket, locking elements, holes, etc.) have the same size and shape, except for the containers which may have different shapes and volumes, as specified above.

Preferably, the containers R1, R2, R3 have at least one housing D in proximity to each edge O of the support base A.

Figure 5B:
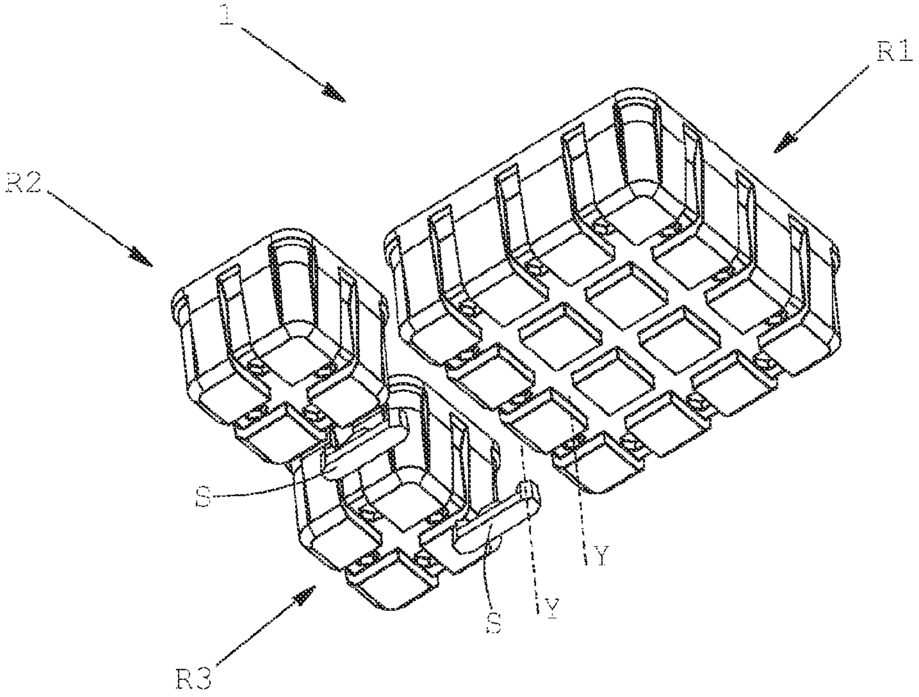
FIG. 5*b* is an exploded bottom perspective view of the view of FIG. 5*a;*

As previously mentioned, the assembly procedure of the system 1 provides for the container to be inserted and locked onto the bracket with a simple movement which occurs only along a vertical axis Y (FIGS. 5*b*, 7*c*).

In general, said collection containers as well as the bracket are made of plastic material, for example polyethylene. This material allows them to be advantageously produced by, for example, a moulding or thermoforming process.

Of course, the invention is not limited to the embodiments illustrated and described above, those skilled in the art may make variations and modifications without departing from the scope of the invention.

The invention claimed is:

1. A containment system for a substance in liquid or particulate form, said system comprising juxtaposed collection containers and at least one connection bracket having locking elements, in which the bracket comprises:

a flattened base; and locking means comprising at least two locking elements, protruding from two respective ends of the base;

and in which each container has a polygonal plan and comprises:

a support base confined by edges;

side walls; and a grill, present on the opposite side to the support base and resting on the walls;

in which said support base presents on the support base's outer surface at least one groove that comes out on at least one edge of the support base, said groove having at least one indented housing having a plan shape equal to that of the locking elements, in which said housing is in proximity to one of said edges and in which said bracket has said first locking element inserted into the housing of a first container and said second locking element inserted into the housing of a second container, and in which at least two containers have at least one housing at the top of which there is a through bore.

2. The containment system according to claim 1, in which at least one bracket has a through bore at the top of each of the locking elements, said locking elements being in fluid communication with each other, said at least one bracket being inserted in the housings having said through bore.

3. The containment system according to claim 2, further comprising connectors inserted in the through bores.

4. The containment system according to claim 1, in which the locking elements have a polygonal plan shape.

5. The containment system according to claim 1, in which the locking elements have a shape that is tapered from the base to the top.

6. The containment system according to claim 1, in which at least two containers have the support base with at least one chamfered edge and at least one bracket comprises a further centering element that is equidistant between the two locking elements and that inserts between the chamfered edges.

7. The containment system according to claim 1, in which at least one groove comes out onto each edge of the support base of a container.

8. The containment system according to claim 1, in which the groove comes out onto two opposite edges of the support base of a container.

9. The containment system according to claim 1, in which there is at least one housing in the vicinity of each edge of the support base.

10. The containment system according to claim 4, in which at least two containers have the support base with at least one chamfered edge and at least one bracket comprises a further centering element that is equidistant between the two locking elements and that inserts between the chamfered edges.

11. The containment system according to claim 5, in which at least two containers have the support base with at least one chamfered edge and at least one bracket comprises a further centering element that is equidistant between the two locking elements and that inserts between the chamfered edges.

12. The containment system according to claim 4, in which at least one groove comes out onto each edge of the support base of a container.

13. The containment system according to claim 5, in which at least one groove comes out onto each edge of the support base of a container.

14. The containment system according to claim 6, in which at least one groove comes out onto each edge of the support base of a container.

15. The containment system according to claim 7, in which at least one groove comes out onto each edge of the support base of a container.

16. The containment system according to claim 8, in which at least one groove comes out onto each edge of the support base of a container.

* * * * *